United States Patent [19]

Milovanovic et al.

[11] 4,264,744

[45] Apr. 28, 1981

[54] USE OF LOW MOLECULAR WEIGHT POLYHYDROXY COMPOUNDS IN METHYLENE CHLORIDE BLOWN POLYURETHANE FOAMS

[75] Inventors: Olga L. Milovanovic; Wolf Sehr, both of Horgen, Switzerland; Richard S. Sayad, Midland, Mich.

[73] Assignee: The Dow Chemical Company, Midland, Mich.

[21] Appl. No.: 106,822

[22] Filed: Dec. 26, 1979

Related U.S. Application Data

[63] Continuation-in-part of Ser. No. 2,266, Jan. 10, 1979, abandoned.

[51] Int. Cl.$^3$ .............................................. C08G 18/14
[52] U.S. Cl. .................................... 521/110; 521/112; 521/123; 521/127; 521/131
[58] Field of Search ............... 521/110, 112, 123, 127, 521/131

[56] References Cited

U.S. PATENT DOCUMENTS

| 3,914,189 | 10/1975 | Rudner et al. | 521/127 |
| 4,150,212 | 4/1979 | Meyborg | 521/127 |

*Primary Examiner*—Maurice J. Welsh
*Attorney, Agent, or Firm*—A. C. Ancona

[57] ABSTRACT

The use of methylene chloride as a blowing agent for resinous foams, particularly urethane foams is improved by incorporating a low molecular weight polyhydroxy aliphatic compound having more than two hydroxyl groups. Simultaneously with the addition the amount of gelling catalyst (e.g., stannous octoate) required to obtain good foam, particularly the very soft foams, is reduced over that required using the methylene chloride without the addition of the polyhydroxy compound. Similarly, when the polyhydroxy compound of this invention is used, smaller amounts of the gelling catalyst are employed for equal foam properties when the fluorinated halocarbons are employed either alone or in combination with the methylene chloride.

5 Claims, No Drawings

USE OF LOW MOLECULAR WEIGHT POLYHYDROXY COMPOUNDS IN METHYLENE CHLORIDE BLOWN POLYURETHANE FOAMS

REFERENCE TO PRIOR APPLICATION

This is a continuation-in-part of our earlier filed application Ser. No. 022,266, filed Jan. 10, 1979, now abandoned.

BACKGROUND OF INVENTION

In recent months the conventional blowing agents, the fluorochlorocarbons, e.g., fluorocarbon 11, have come under attack from environmentalists. The urethane foam industry which has had such good results using these agents has had to turn to other blowing agents to supplant all or part of the conventional fluorocarbons, e.g., fluorocarbon F-11. The logical choice was methylene chloride, a blowing agent which has been used by industry on a selective basis at lower levels in the past. The urethane foam industry found that methylene chloride was not a suitable blowing agent at higher levels because it required excessive amounts of gellation catalysts to fix the urethane in its risen or foam state prior to final cure and that these increased amounts of gellation agent reduced processing latitude. The practice today is to use a co-blowing agent with the methylene chloride or accept the requirement that large amounts of the gelling catalyst are required. As a result the industry has used the methylene chloride sparingly.

It is an object of the present invention to provide a means enabling the use of methylene chloride as the sole agent to replace the fluorohalohydrocarbons and to reduce the amount of the gelling catalyst required to obtain stability in the foam until curing can occur when using the methylene chloride.

BRIEF DESCRIPTION OF THE INVENTION

In accordance with the invention, it has been found that a stable pre-cured urethane foam can be established employing methylene chloride alone or in combination with the conventional fluorocarbon blowing agent by incorporating into the foam from about 0.1 to about 1.5 parts per 100 parts of polyether polyol of a polyhydroxyaliphatic hydrocarbon having more than two hydroxyl groups per molecule. Suitable compounds are glycerine and the hydroxypropyl ethers of glycerine and pentaerythritol. The conventional proportions of polyol, isocyanate, amine catalyst, metal salt catalyst, surfactants, water, fatty acids, etc. are not altered from those known and used in the art today.

Surprisingly it has been found that by the incorporation of the polyhydroxy aliphatic compound of the nature above described the foam is pre-set with only slightly more metal salt catalyst than is commonly employed when using a fluorocarbon blowing agent alone. The preparation of foam using the methylene chloride and the polyhydroxy compounds of the present invention is of almost as great a latitude as when using the fluorocarbon blowing agents, that is to say that the proportions of the metal catalysts can vary over almost as wide a range when employing the methylene chloride and the polyhydroxy compounds of the present invention and yet obtain a high quality super soft foam as when one employs only the fluorocarbons, the standard of the industry. Co-incidentally the amount of metal catalyst is reduced by as much as 30% over that required to obtain an equivalent foam from a formulation employing methylene chloride, as a replacement for a part or all of the conventional fluorocarbon blowing agents, without the polyhydroxy compound of the present invention.

DETAILED DESCRIPTION OF THE INVENTION

The process according to the invention is preferably carried out utilizing the same components commercially employed in the manufacture of polyurethane foams save for the substitution of methylene chloride for all or a part of the conventional fluorocarbon blowing agent by the addition of small amounts of a polyhydroxy compound as hereinafter defined. The combination permits the use of less gellation catalyst than previously necessary to obtain a foam, albeit denser or less soft. It is to be understood that the optional components of commercial formulations such as fillers, activators, stabilizers and pigments may likewise be employed.

The polyol components used are known and are preferably polyethers having molecular weights of from 800 to 5000 and preferably from 2500 to 4500. They can be used in admixture with low molecular weight polyols and with the addition of activators and blowing agents. Mineral fillers, foam stabilizers, antiagers and similar additives of the kind normally used in polyurethane chemistry may also be added to the polyols. The polyethers suitable for use include those obtained by polymerizing tetrahydrofuran or epoxides such as ethylene oxide, propylene oxide, butylene oxide, styrene oxide or epichlorohydrin in the presence of a catalyst such as $BF_3$, or by adding these epoxides in admixture or in succession, to starter components containing reactive hydrogen atoms such as water, alcohols or amines. Suitable starter components include ethylene glycol, 1,3-propylene glycol, 1,2-propylene glycol, trimethylol propane, 4,4'-dihydroxy diphenyl propane, aniline, ammonia, ethanolamine, ethylene diamine and water. Sucrose polyethers of the type described in German Auslegeschrifts Nos. 1,176,358 and 1,064,938 may also be used in accordance with the invention. In many cases, it is preferred to use polyethers of the type generally known which contain substantial amounts of primary OH-groups (up to 90% by weight, based on all the OH-groups present in the polyether). Polyethers modified with vinyl polymers of the type formed by polymerizing styrene and acrylonitrile in the presence of polyethers are also suitable as are polybutadienes containing OH-groups.

Instead of using polyethers, it is also possible as is recognized in the polyurethane art to utilize polyesters, polythioethers, polyacetals, polycarbonates, polyester amides, or mixtures thereof, having molecular weights in the range from 400 to 10,000 and preferably from 1000 to 6000.

The polyesters containing hydroxyl groups suitable for use include the reaction products of polyhydric (preferably dihydric and optionally trihydric) alcohols with polyvalent (preferably divalent) carboxylic acids, instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be substituted (e.g., with halogen atoms) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydrous; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trumeric fatty acids; such as oleic acid, which may be in admixture with monomeric fatty acids, terephthalic acid dimethyl ester; terephthalic acid bis-glycol ester and the like. Examples of suitable polyhydric alcohols include ethylene glycol, 1,2-propylene glycol, 1,3-propylene glycol; 1,4- and 2,3-butylene glycol; 1,6-hexanediol; 1,8-octanediol; neopentyl glycol; cyclohexane dimethanol (1,4-bis-hydroxy methyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol, dipropylene glycol; polypropylene glycols; dibutylene glycol; polybutylene glycols and the like. The polyesters may contain some terminal carboxyl groups. It is also possible to use polyesters of lactones such as δ-caprolactone, or hydroxy carboxylic acids such as ω-hydroxy caproic acid.

The polythioethers usable include the condensation products of thiodiglycol alone or thiodiglycol with other glycols, dicarboxylic acids, formaldehyde, amino carboxylic acids or amino alcohols. The products can be characterized as polythio mixed ethers, polythioether esters or polythioether ester amides, depending upon the cocomponents used.

Examples of suitable polyacetals include the compounds obtained from glycols, such as diethylene glycol, triethylene glycol, 4,4'-dioxethoxydiphenyl dimethyl methane, and hexane diol, and formaldehyde. Polyacetals suitable for use in accordance with the invention can also be obtained by polymerizing cyclic acetals.

Suitable polycarbonates containing hydroxyl groups are those of the type which are generally known and which may be obtained by reacting diols, such as 1,3-propane diol, 1,4-butane diol and/or 1,6-hexane diol, diethylene glycol, triethylene glycol or tetraethylene glycol, with diaryl carbonates (for example diphenyl carbonate) or phosgene.

The polyester amides and polyamides suitable for use herein include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified natural polyols, such as castor oil, carbohydrates or starch, may also be used. Addition products of alkylene oxides with phenol-formaldehyde resins or even with urea-formaldehyde resins may also be used in accordance with the invention.

Examples of the many and varied types of compounds suitable for use in accordance with the invention are described, for example, in High Polymers, Vol. XVI, "Polyurethanes, Chemistry and Technology:, by Saunders-Frisch, Interscience Publishers, New York, London, Vol. I, 1962, pages 32 to 42 and pages 44 to 54, and Vol. II, 1964, pages 5 to 6 and 198 to 199, and also in Kunststoff-Handbuch, Vol. VII, Vieweg-Hochtlen, Carl-hanser-Verlag, Munich, 1966, pages 45 to 71.

Essentially any organic polyisocyanate may be used herein. Thus, it is possible in accordance with the invention to utilize araliphatic, aromatic and heterocyclic polyiosocyanates. Specific examples of useful isocyanates include, 1,3- and 1,4-phenylene diisocyanate; 1,4- and 3,6-tolylene diisocyanate and mixtures of these isomers, diphenyl methane-2,4'-and/or 4,4'-diisocyanate; naphthylene-1,5-diisocyanate; triphenylmethane-4,4',4''-triisocyanate; polyphenyl polymethylene polyisocyantes which may be obtained by condensing aniline with formaldehyde, followed by phosgenation and which are of the type described for example in British Pat. Nos. 874,430 and 848,671, perchlorinated aryl polyisocyanates of the type described in German Pat. No. 1,092,007; the diisocyanates described in U.S. Pat. No. 3,492,330; polyisocyanates containing allophanate groups of the type described for example in British Pat. No. 994,890 Belgian Pat. No. 761,626 and published Dutch Patent Application No. 7,102,524; polyisocyanates containing isocyanate groups of the type described, for example, in German Pat. Nos. 1,022,789; 1,222,067 and 1,027,394 and in German Offenlegungsschrifts Nos. 1,929,034 and 2,004,048; polyisocyanates containing urethane groups as described in U.S. Pat. No. 3,394,164; the polyisocyanates containing acylated urea groups described in German Pat. No. 1,230,778; polyisocyanates containing biuret groups of the type described, for example, in German Pat. No. 1,101,394, in British Pat. No. 889,050 and in French Pat. No. 7,017,514; polyisocyanates obtained by telomerization reactions as described in Belgian Pat. No. 723,640; polyisocyanates containing ester groups of the type described, for example, in British Pat. Nos. 956,474 and 1,072,956, in U.S. Pat. No. 3,567,763 and in German Pat. No. 1,232,688; and reaction products of the above-mentioned isocyanates with acetals as described in German Pat. No. 1,072,385.

It is also possible to use the distillation residues containing isocyanate groups which accumulate in the industrial-scale production of isocyanates, optionally in solution in one or more of the abovementioned polyisocyanates. It is also possible to use mixtures of the aforementioned polyisocyanates.

In general, it is particularly preferred to use readily available polyisocyanates, such as 2,4- and 2,6-tolylene diisocyanate and mixtures of these isomers (TDI), polyphenylpolymethylene polyisocyanates; of the type obtained by condensing aniline with formaldehyde, followed by phosgenation (crude MDI); and polyisocyanates containing carbodiimide groups, urethane groups, allophanate groups, isocyanurate groups, urea groups or biuret groups (so-called modified polyisocyanates).

Blowing agents suitable for use in combination with the methylene chloride in accordance with the instant invention include water and/or readily volatile organic substances. Examples of organic blowing agents include acetone; ethyl acetate; halogen-substituted alkanes such as chloroform; ethylene chloride; vinylidene chloride; monofluorotrichloromethane; chlorodifluoromethane and dichlorodifluoromethane; butane; hexane; heptane; diethylethers and the like.

Additionally, catalysts are often used in the process of the instant invention. Suitable catalysts include tertiary amines such as triethyl amine, tributyl amine, N-methyl morpholine, N-ethyl morpholine, N-cocomorpholine, N,N,N', N'-tetramethyl ethylene diamine, 1,4-diazabicyclo-(2,2,2)-octane, N-methyl-N'-dimethyl aminoethyl piperazine, N,N-dimethyl benzyl amine, bis- (N,N-diethyl aminoethyl)-adipate, N,N-diethyl benzyl amine, pentamethyl diethylamine triamine, N,N-dimethyl cyclohexyl amine, N,N,N', N'-tetramethyl-1,3-butane diamine, N,N-dimethyl-β-phenyl ethyl amine, 1,2-dimethyl imidazole and 2-methyl imidazole.

Suitable metal catalysts include metal chelates, bicyclic amidines and monocyclic amidines, either alone or especially in combination with monocarboxylic or dicarboxylic acids with metal octoates and the like preferred.

Suitable bicyclic amidines include compounds corresponding to the general formula

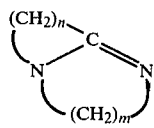

in which m=2 or 3 and n 3, 4 or 5.

Examples of monocyclic amidines include compounds corresponding to the general formula

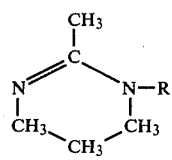

in which R is an optionally branched and/or heteroatomcontaining aliphatic, cycloaliphatic, araliphatic or aromatic radical having 1 to 15 carbon atoms. R may thus be, for example, methyl, cyclohexyl, 2-ethyl hexyl, benzyl, cyclohexyl methyl, ethoxyl or a radical corresponding to the formula

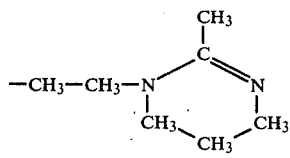

In addition, other catalysts may also be used in the process according to the invention. Examples of these catalysts and information about the manner in which they perform may be found in Kunststoff-Handbuch, Vol. VII, Vieweg and Hochtlen, Carl-Hanser-Verlag, Munich 1966, pages 96–102.

It is advantageous although not absolutely essential, to use surface-active additives, such as emulsifiers and foam stabilizers, of the type commonly used in the production of foamed polyurethanes, in the process according to the invention. Silicone-containing stabilizers are particularly desirable in cases where the reactive mixture is prefoamed by "whipping in" air and "whipfoaming" before or during the chemical reaction. One example of a silicone stabilizer of this kind suitable for mechanically prefoamed compounds in Union Carbide's Silicon Surfactant L 5612 (see Example 1 of DOS No. 2,210,934 corresponding to U.S. Ser. No. 122,164).

Polyols containing fillers may also be used for the process according to the invention. Examples of suitable fillers include, naturally occurring minerals such as chalk, kaolin or baryta in finely divided form, aluminum oxide hydrates, mixtures thereof and mixtures with other fillers and/or flameproofing additives.

The reaction components may be generally reacted in known manner by the one-stage process, by the prepolymer process or even by the semi-prepolymer process, advantageously using machinery of the kind described, for example in Kunststoff-Handbuch, Vol. VII, Vieweg-Hochtlen, Carl-Hanser-Verlag, Munich 1966, on pages 121 to 205.

The following examples illustrate that super soft polyurethane foams can be prepared using smaller amounts of the metal catalyst when methylene chloride is employed as the principal auxiliary blowing agent, along with the low molecular weight polyhydroxy compounds in accordance with the present invention, than previously employed when the low molecular weight polyhydroxy compound of the present invention was omitted. Further, the amount of catalyst employed when a polyurethane foam is prepared in accordance with the present invention is nearer that which the art expects to employ when using the fluorocarbons of the present day art.

In order to obtain a fair comparison of properties the comparative examples have been run on similar laboratory foam apparatus to produce about three foot high slabs, thirty foot long. While the properties are not the same as those obtained on commercial scale continuous apparatus, the laboratory scale apparatus produces foams which are consistently comparable, albeit having slightly poorer characteristics than the commercial scale equipment produced foams.

The following table sets forth the results obtained employing laboratory equipment. The data illustrates that the addition of glycerine to a foam formulation in which methylene chloride is to be used as a blowing agent to produce super-soft foams reduces the amount of metal catalyst, such as stannous octoate, required to produce substantially equivalent foams. Runs 1 through 4, which are comparative runs, illustrate the characteristics obtained in the laboratory equipment producing about 3 foot high, 30 foot long foams when using methylene chloride and no glycerine as is common practice in the industry today. The amounts of metal catalyst are 150 to 175 percent greater than that metal catalyst commonly used by the industry when fluorocarbon F-11 is used as the blowing agent rather than methylene chloride (see comparative runs 11 and 12). Runs 5–10 illustrate the invention and show the marked reduction in metal catalyst required to obtain foams of equivalent properties when 0.5 parts of glycerine are used per 100 parts of polyol.

EXAMPLE I

| Components/Properties | Runs: | | | | | |
|---|---|---|---|---|---|---|
| | 1 | 2 | 3 | 4 | 5 | 6 |
| TDI·Ind[1] | 108 | | | | 108 | |
| TDI[2] | 46.5 | | | | 48.1 | |
| Polyol[3] | 100 | | | | 100 | |
| Water | 3.5 | | | | 3.5 | |
| F-11 | none | SAME* | SAME | SAME | none | SAME |

EXAMPLE I-continued

| Components/Properties | Runs: | | | | | |
|---|---|---|---|---|---|---|
| MeCl$_2$ | 22 | | | | 22 | |
| SILIC.[4] | 1.5 | | | | 1.5 | |
| Am CAT[5] | 0.25 | | | | 0.25 | |
| MET. CAT[6] | .7 | .675 | .65 | .625 | .5 | .525 |
| Glyc. | | | | | .5 | .5 |
| Density | .94 .94 .96 | .93 .94 .98 | .92 .95 .98 | .95 .96 1.0 | .92 .94 .97 | .92 .93 .96 |
| Tensil[8] | 6.8 | 6.7 | 6.3 | 6.3 | 6.6 | 6.9 |
| % Elong[9] | 123 | 125 | 107 | 117 | 113 | 116 |
| Resil %[10] | 48 48 50 | 48 48 51 | 50 50 52 | 50 50 52 | 47 49 50 | 45 47 48 |
| Tear Res[11] | 1.1 | 1.0 | 1.0 | 1.0 | .9 | 1.0 |
| Com. Set[12] | 5/5.8 | 4.4/5.2 | 3.8/4.4 | 3.8/4.4 | 4.7/5.4 | 4.8/6.2 |
| ILD 25%[13] | 14 17 16 | 14 17 17 | 13 16 16 | 13 16 16 | 15 17 16 | 15 17 17 |
| 4" 65% | 25 30 29 | 25 29 32 | 23 28 30 | 24 30 30 | 26 30 31 | 27 30 37 |
| RET. 25% | 10 12 12 | 10 11 12 | 9 11 12 | 9 12 12 | 10 12 12 | 10 12 13 |
| Air Flow[14] | 5.7 | 6.2 | 6.7 | 7.2 | 4.5 | 3.0 |
| M | 3.6 | 4.4 | 4.3 | 4.7 | 3.0 | 2.5 |
| B | 1.8 | 1.2 | 2.0 | 3.0 | 1.6 | .9 |

| | 7 | 8 | 9 | 10 | 11 | 12 |
|---|---|---|---|---|---|---|
| TDI IND[1] | 108 | 104 | | | 110 | 105 |
| TDI[2] | 48.1 | 46.5 | | | 48.0 | 44.8 |
| Polyol[3] | 100 | 100 | | | 100 | 100 |
| Water | 3.5 | 3.5 | SAME | SAME | 3.6 | 3.5 |
| F-11 | none | none | | | 24 | 25 |
| MeCl$_2$ | 22 | 22 | | | none | none |
| SILIC.[4] | 1.5 | 1.5 | | | 1.8 | 1.6 |
| Am CAT[5] | | | | | .42 | .325 |
| MET. CAT[6] | .475 | .525 | .50 | .475 | .30 | .4 |
| Glyc. | .5 | .5 | .5 | .5 | | |
| Density | .92 .94 .96 | .97 1.0 1.03 | .94 .96 1.01 | .98 1.01 1.1 | .935 | 1.05 |
| Tensil[8] | 6.5 | 6.7 | 6.4 | 6.7 | .9 | 9.6 |
| % Elong[9] | 118 | 146 | 122 | 128 | 185 | 314 |
| Resil %[10] | 50 51 49 | 48 50 51 | 49 51 52 | 50 51 53 | 50 | 48 |
| Tear Res[11] | .9 | .9 | 1.0 | 1.0 | 1.2 | 2.5 |
| Com Set[12] | 3.6/4.2 | 4.3/4.4 | 4.0/4.3 | 4.4/5.5 | 5 | 8.3/9.4 |
| ILD[13] 25% | 13 15 16 | 15 16 17 | 13 16 17 | 13 16 14 | 14 | 13 |
| 4" 65% | 23 26 28 | 26 30 32 | 24 29 31 | 25 30 30 | 27 | 23 |
| RET. 25% | 9 11 12 | 10 12 12 | 9 11 12 | 10 12 10 | — | — |
| Air Flow[14] | 6.5 | 4.9 | 6.8 | 7.1 | 5.6 | 6.8 |
| M | 5.6 | 3.8 | 3.4 | 4.6 | | 6.5 |
| B | 3.8 | 1.2 | 1.9 | 2.0 | 4.5 | 6.8 |

*"SAME" indicates that the components within brackets are the same as in the preceding Run.

FOOTNOTES
[1]TDI Index
This figure indicates the amount of TDI (toluene diisocyanate) available for reaction with the polyol and water.
[2]TDI toluene diisocyanate 80/20 isomer ratio.
[3]This polyol was a 3000 molecular weight triol (derived from glycerine and ethylene oxide-propylene oxide)heterogeneous.
[4]A silicone surfactant.
[5]Two amine catalysts, Polycat 12 and Dabco 33 LV.
[6]Metal catalyst stannous octoate.
[7]Density in lbs./cu. ft.
[8]Tensil strength lb./in$^2$.
[9]Elongation = $\frac{\text{final length} - \text{original length}}{\text{original length}} \times (100) = \%$.
[10]Resiliency.
[11]Tear resistance.
[12]Compressive set.
[13]ILD (Indentation Load Deflection). An indication of the load bearing ability of the foam. The standard test is described in ASTM Test Method D-1564.
[14]Air flow.

Example II illustrates runs in which a fluorocarbon was employed as the blowing agent with and without the polyhydroxy compound, documentation that smaller amounts of gellation catalyst can be used with a fluorocarbon and glycerine, run 2, versus no glycerine, run 1. Substantially equivalent foams were obtained.

EXAMPLE II

| Formulation | Run 1 | Run 2 |
|---|---|---|
| Polyol 3010 | 100 | 100 |
| TDI Index | 108 | 108 |
| TDI | 46.4 | 48 |
| H$_2$O | 3.5 | 3.5 |
| Blow Ag F-11 | 23.0 | 23.0 |
| Silicone L-540 | 1.5 | 1.5 |

-continued

| Formulation | Run 1 | Run 2 |
|---|---|---|
| Amine N/A × A-1 | 0.1 | 0.1 |
| Dabco 33LV | 0.22 | 0.22 |
| Tin | 0.37 | 0.2 |
| Glycerine | — | 0.5 |

EXAMPLE III

In this example another polyol—an adduct of propylene oxide (P.O.) and glycerine—which is soluble in methylene chloride was used in place of the glycerine of the previous examples. The adduct contained 1.6 moles of P.O. per mole of glycerine. Again foams of comparable properties were produced while employing less metal catalyst when the glycerine-P.O. adduct was employed according to the invention. Run 1 is the control (i.e., contains no adduct) and Runs 2–4 were performed in accordance with the invention*.

*All components in Runs 2–4 are the same as the control (Run 1) except where noted.

| Formulation | Run 1 | Run 2 | Run 3 | Run 4 |
|---|---|---|---|---|
| Polyol 3010 | 100 | | | |
| TDI Index | 108 | | | |
| TDI | 46.4 | 47.2 | 47.0 | 46.9 |
| $H_2O$ | 3.5 | | | |
| Blow Ag $MeCl_2$ | 22 | | | |
| Silicone L-540 | 1.50 | | | |
| Polycat 12 | 0.17 | | | |
| Dabco 33LV | 0.08 | | | |
| Tin | 0.575 | 0.50 | 0.45 | 0.50 |
| Adduct | none | 0.5 | 0.4 | 0.3 |

We claim:

1. In a method for preparing a polyurethane foam by reacting a polyether polyol having a molecular weight of from about 800 to about 5000, an isocyanate, water, a metal salt catalyst, an amine catalyst, a silicone surfactant and a halogenated hydrocarbon blowing agent, which blowing agent is at least 10% methylene chloride, the improvement which consists of incorporating from about 0.1 to about 1.5 parts per 100 parts of polyether polyol of a polyhydroxy compound having at least three hydroxyl groups and a molecular weight of not more than about 195, while employing from about 1.2 to about 1.8 times the metal salt catalyst of that used where a fluorocarbon is the sole blowing agent.

2. The method of claim 1 wherein the polyhydroxy compound is glycerine.

3. The method of claim 1 wherein the polyhydroxy compound is an adduct of glycerine and propylene oxide.

4. The method of claim 3 wherein the adduct contains 1.6 moles of propylene oxide per mole of glycerine.

5. In a method for preparing a polyurethane foam by reacting a polyether polyol having a molecular weight of from about 800 to about 5000, an isocyanate, water, a metal salt catalyst, an amine catalyst, a silicone surfactant and a halogenated hydrocarbon blowing agent, which blowing agent is at least 10% methylene chloride, the improvement which consists of incorporating from about 0.1 to about 1.5 parts per 100 parts of polyether polyol of a polyhydroxy compound having at least three hydroxyl groups and a molecular weight of not more than about 195, and wherein from about 16 to about 32% less of the metal salt catalyst is employed than is employed in the absence of said polyhydroxy compound.

* * * * *

UNITED STATES PATENT AND TRADEMARK OFFICE
CERTIFICATE OF CORRECTION

PATENT NO. : 4,264,744
DATED : April 28, 1981
INVENTOR(S) : Olga L. Milovanovic and Wolf Sehr and Richard S. Sayad It is certified that error appears in the above-identified patent and that said Letters Patent are hereby corrected as shown below:

Column 1 line 9 change "022,266" to --002,266--.

Column 5 line 2 change "diethylamine" to --diethylene--.

Signed and Sealed this

Sixth Day of October 1981

[SEAL]

Attest:

GERALD J. MOSSINGHOFF

Attesting Officer

Commissioner of Patents and Trademarks